United States Patent [19]

Berman et al.

[11] Patent Number: 5,368,321
[45] Date of Patent: Nov. 29, 1994

[54] DUAL-FOOTBOARD LOW-PROFILE EXERCISE CYCLE

[75] Inventors: Paul A. Berman, Los Angeles; Kenneth A. Tarlow, Santa Monica; Jack Holmes, Studio City, all of Calif.; Allan Douglas, P.O. Box 1662, El Prado, N. Mex. 87529

[73] Assignee: Allan Douglas, Van Nuys, Calif.

[21] Appl. No.: 104,664

[22] Filed: Aug. 11, 1993

[51] Int. Cl.⁵ .............................................. B62M 1/04
[52] U.S. Cl. .................................. 280/221; 280/241; 280/251; 280/282
[58] Field of Search .............. 280/221, 241, 251, 252, 280/253, 258, 282, 288.1, 220

[56] References Cited

U.S. PATENT DOCUMENTS

| | | | |
|---|---|---|---|
| 211,868 | 2/1879 | Smith | 280/251 |
| 1,272,761 | 7/1918 | Bailey | 280/251 |
| 4,186,934 | 2/1980 | Collings | 280/221 |
| 4,574,649 | 3/1986 | Seol | 280/251 |
| 4,828,284 | 5/1989 | Sandgren | 280/221 |
| 4,928,986 | 5/1990 | Carpenter | 280/241 |
| 5,207,442 | 5/1993 | Gray | 280/253 |

FOREIGN PATENT DOCUMENTS 1025877 4/1953 France ...................... 280/221

Primary Examiner—Richard M. Camby
Assistant Examiner—A. M. Boehler
Attorney, Agent, or Firm—J. E. McTaggart

[57] ABSTRACT

An exercise cycle is propelled by a stair-stepping action of the driver's legs, with the feet placed on a pair of front-hinged footboards located along opposite sides of the vehicle. A novel cable and chain drive system delivers driving torque to the rear wheel assembly to propel the vehicle forward in response to the driver's weight being applied via the legs and feet to depress the footboards alternately: the driving mechanism is located in a lower forward portion of the cycle so as to keep the mechanism below the rear wheel height and thus provide a low profile.

9 Claims, 5 Drawing Sheets

DUAL-FOOTBOARD LOW-PROFILE EXERCISE CYCLE

FIELD OF THE INVENTION

The present invention relates to human-powered two wheeled vehicles and more particularly it relates to such a vehicle in a low-profile configuration, propelled by a pair of pivoted footboards, directed to providing a special form of recreational physical exercise.

BACKGROUND OF THE INVENTION

Recent decades have been characterized by major trends toward widespread ecological awareness and health-consciousness. New needs have arisen for self powered recreational vehicles which don't consume fuel energy or pollute the atmosphere; along with a resurgence of popularity of the conventional bicycle, there has developed an increasing demand for alternative human-powered vehicles in forms which depart radically from the bicycle. Also, as part of the health-consciousness trend, the search for new exercise products has produced devices which provide new ways to exercise different muscles and parts of the body, for example treadmills and simulated stair-climbing machines. Some of these exercise machines consume electric power, and thus fail to be entirely ecological. Many of these machines are for indoor use, even though the benefits of exercise would be greatly enhanced if, for example, special leg movement exercises could be combined with outdoor mobility with its advantages of fresh air and ever-changing scenery.

PRIOR ART

U.S. Pat. No. 4,828,284 to Sandgren discloses a three-wheeled treadle cycle in which major elements of the driving mechanism including a transverse driveshaft are located above the rear wheel: this configuration necessitates a substantial upward extension of the housing above the rear wheel as evidenced in FIGS. 1, 2, 4 and 8 of the Sandgren patent.

OBJECTS OF THE INVENTION

It is a primary object of the present invention to provide a combination exercise machine and self-propelled two-wheeled vehicle which combines the physical benefits of leg exercise similar to stair climbing with the recreational benefits of vehicular mobility, and which has a configuration free of mechanism above the rear wheel so that a housing in that region may be made close-fitting for a low profile.

It is a further object that the exercise vehicle be made compact and partially collapsible to facilitate storage and to fit into the trunk of an automobile.

SUMMARY OF THE INVENTION

These and other objects and advantages have been realized in the present invention of an exercise vehicle which is propelled by a stair-stepping action of the driver's legs, with the feet placed on a pair of front-hinged footboards located along opposite sides of the vehicle. Typically the cycle is configured as a two-wheeler with a front wheel assembly and a rear wheel assembly each having a single wheel. A novel chain and cable drive system delivers torque to the rear wheel to propel the vehicle forward in response to the driver's weight being applied via the legs and feet to depress the footboards alternately. The major portion of its mechanism is located in a lower portion of the cycle chassis, well forward of the rear wheel, so that the rear wheel is free of overhead mechanism and may be enclosed with a close-fitting housing.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
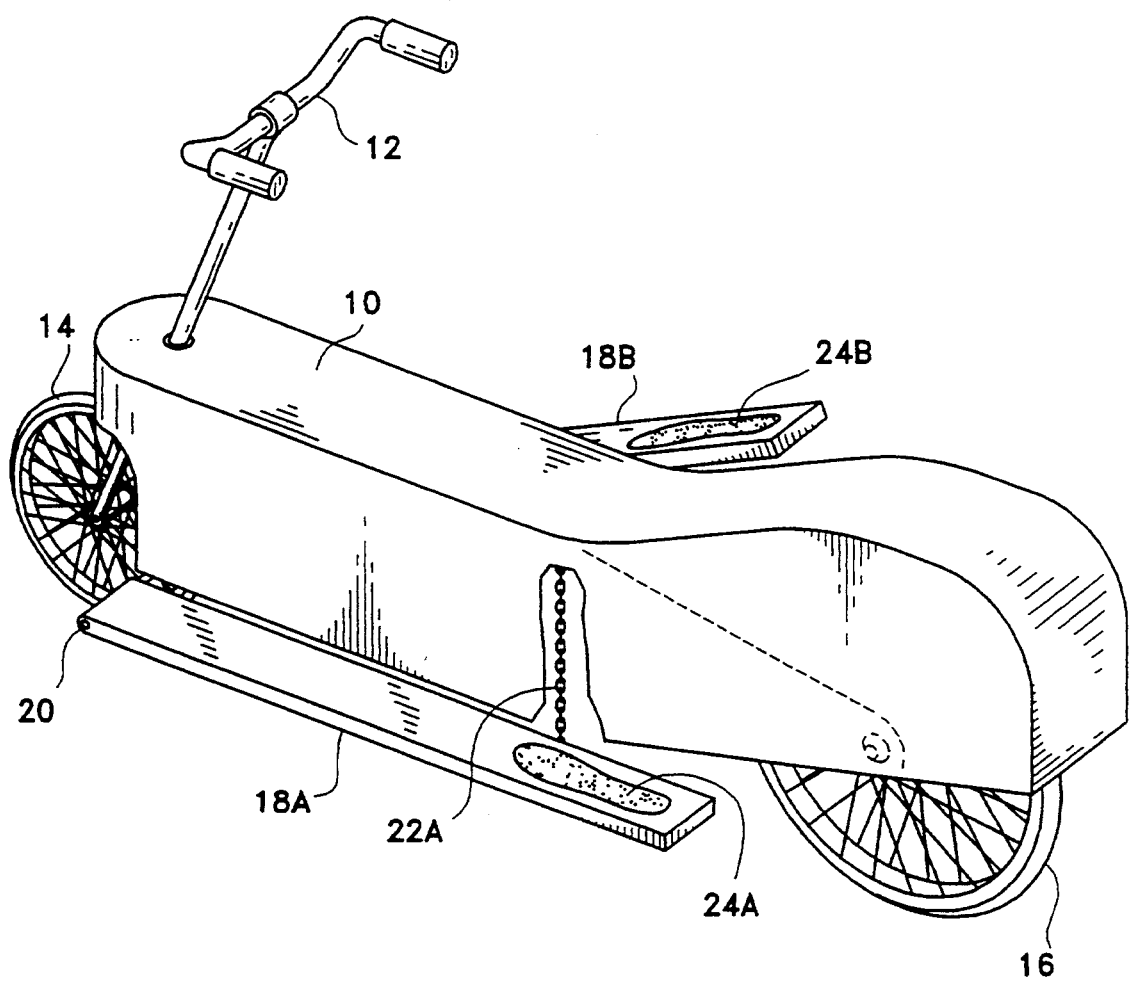
FIG. 1 is a perspective view of an illustrative embodiment of the present invention.

The perspective view of FIG. 1 depicts an illustrative embodiment of the present invention, where the main chassis of a footboard-driven exercise cycle is covered by a shroud 10. A set of handlebars 12, front wheel 14 and rear wheel 16 are similar to counterparts of conventional bicycle structure, except that the handlebars 12 may include folding means at the base of the handlebar post to allow it to fold back for storage or transportation. Footboards 18A and 18B are pivoted at their forward edges on an pivot 20 which may be formed by a transverse steel rod, and are both chain-coupled to an internal driving mechanism as illustrated by chain 22A attached to the inner edge of footboard 18A at a point in its rearward region. Footpads 24A and 24B, which may be rubber pads, indicate regions where a driver's feet are normally placed.

Figure 2:
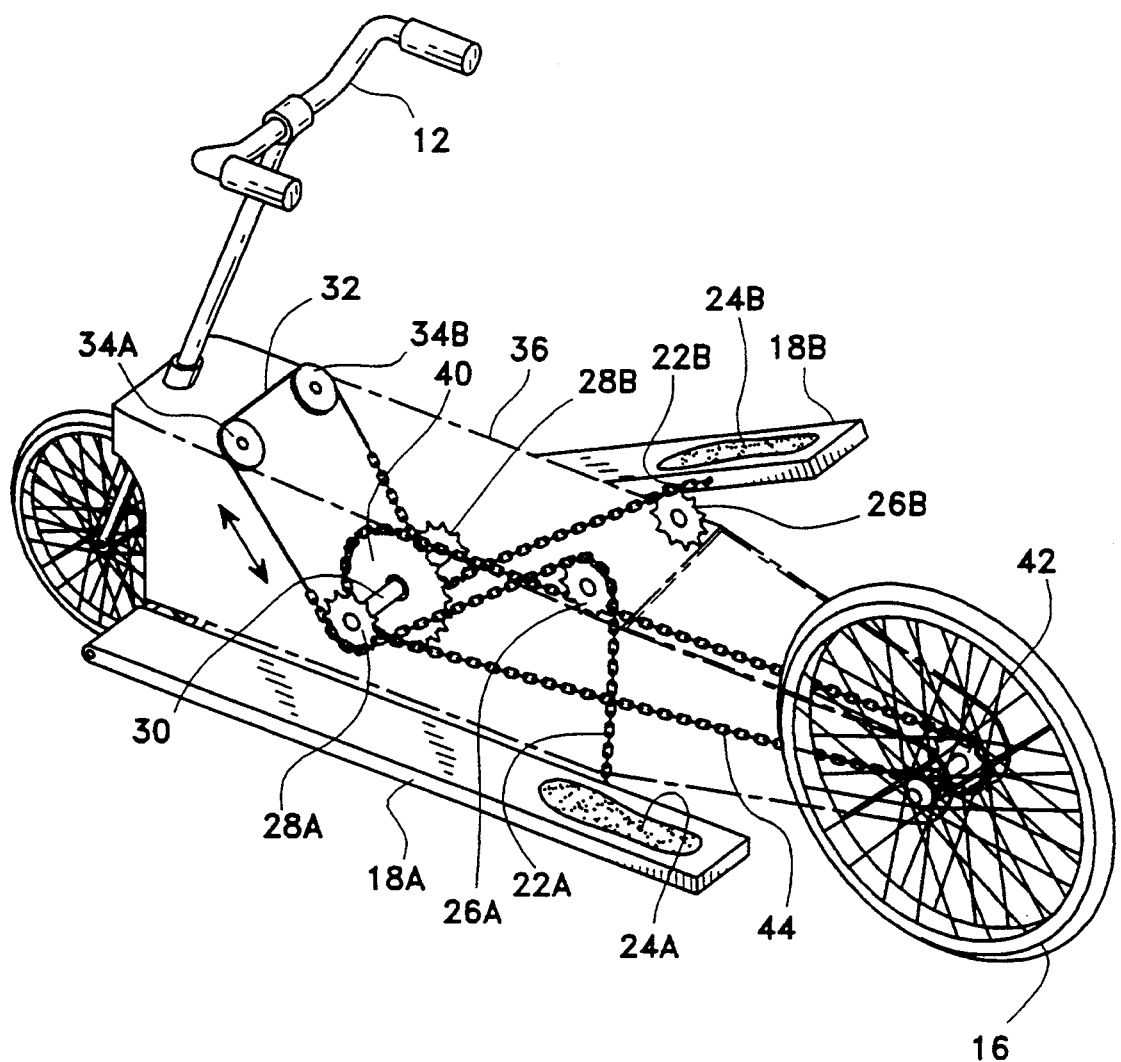
FIG. 2 shows the subject matter of FIG. 1 with shrouds removed to show the drive mechanism.

FIG. 2 is a view of the unit of FIG. 1 with the shroud removed, revealing the drive mechanism for transmitting motive power from footboards 18A and 18B to rear wheel 16.

Chain 22A passes over an idler sprocket 26A, thence engaging a lower portion of a drive sprocket 28A, which is coupled to a transverse driveshaft 30 in a unidirectional-driving manner, e.g. by a known roller-type self-engaging clutch or rotational ratchet assembly.

Somewhat forward of sprocket 28A, the end of chain 22A is coupled to a flexible steel cable 32 which passes over a pair of pulleys 34A and 34B attached at an upper region of the main chassis 36. Cable 32 continues on the opposite side of chassis 36 where it is coupled to a second chain 22B engaging a second drive sprocket 28B which is coupled to the other end of driveshaft 30 in the same unidirectional-driving manner as sprocket 28A. Then chain 22*b* passes over a second idler sprocket 26B to an attachment point on treadle 18B.

The footboard chain drive system has identical (mirror image) left hand and left hand portions. A central portion of chassis 36 is shown cut away to reveal a main drive sprocket 40 which is attached concentrically to driveshaft 30 and coupled by a chain loop 44 to sprocket 42 on the rear wheel 16.

Sprocket 42 could be directly coupled to wheel 16, however in a preferred embodiment sprocket 42 is part of a coaxial multi-speed gear shift mechanism of a type commonly utilized in bicycles which drives the rear wheel 16 from sprocket 42 at a variable ratio.

To operate the cycle, the feet are placed on footpads 24A and 24B of footboards 18A and 18B which are then depressed alternately with the weight of the body, while the rider steers in the manner of a bicycle by means of handlebars 12. On the left hand downstroke sprocket 28A provides motive drive power via driveshaft 30, main drive sprocket 40, chain 44, sprocket 42, and thence rear wheel 16 to propel the vehicle. The right hand footboard, receiving no body weight, is pulled upwardly by tension in cable 32, causing the right hand drive sprocket 28B to counter-rotate on driveshaft 30 in a non-driving mode. Similarly on the right hand downstroke sprocket 28B drives while sprocket 28A counter-rotates in a non-driving mode. Cable 32 serves to keep the two footboards 18A and 18B synchronized in opposite strokes.

Figure 3:
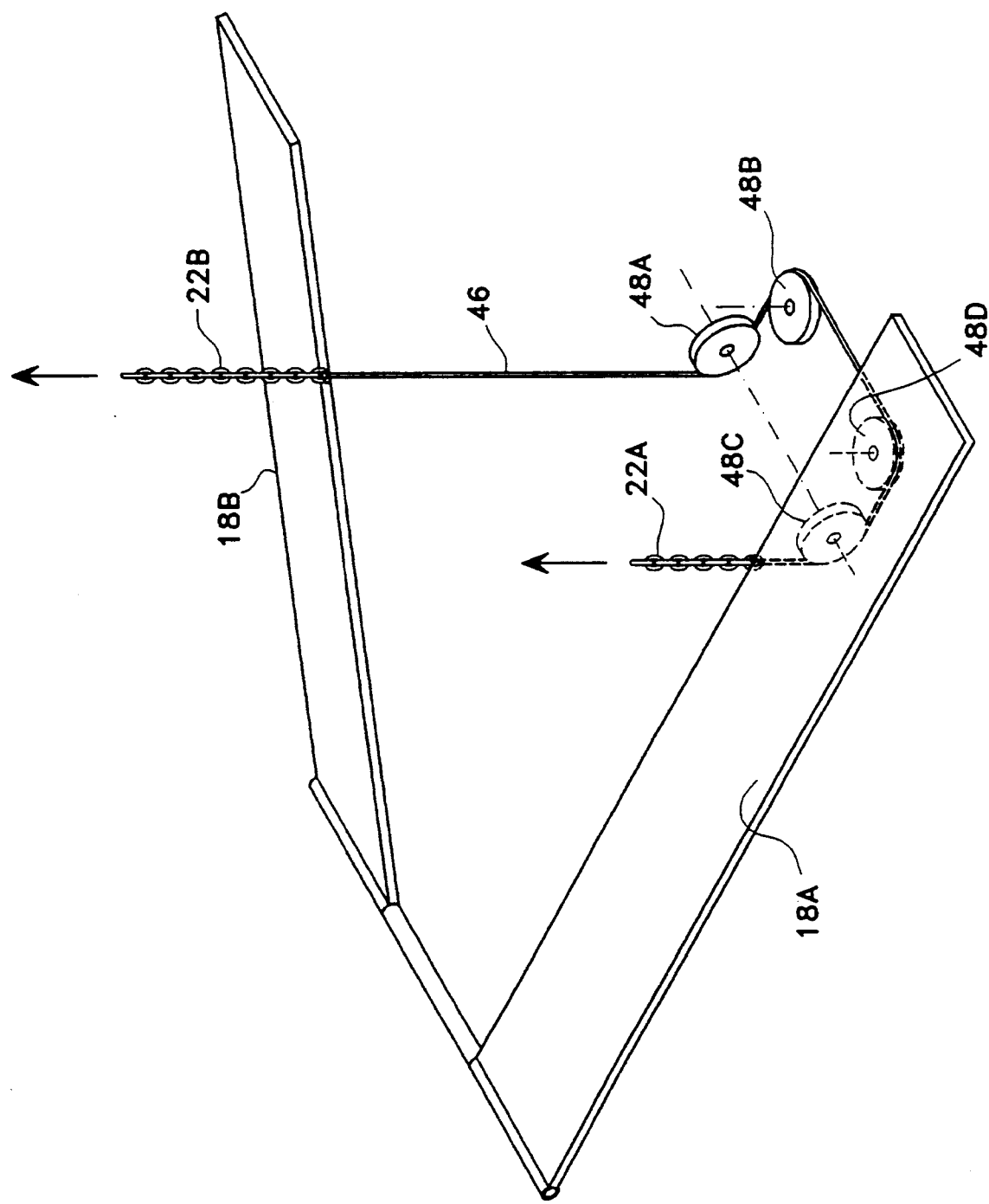
FIG. 3 is a perspective view of the two footboards of the vehicle of FIGS. 1 and 2 with the addition of an optional takeup cable in the footboard drive chain system.

FIG. 3 shows an optional takeup cable 46 which completes the footboard cable/chain drive to a closed loop. Takeup cable 46 passes through four idler pulleys 48A-D configured in the arrangement shown and secured to the main chassis (36, FIG. 2). The ends of takeup cable 46 are attached to footboards 18A and 18B at the same point of effort where the ends of chains 22A and 22B are attached, in effect being attached to the chains end-to-end so as to form a closed loop which includes the two chains and the two cables linked in series. The length of cable 46 is adjusted to take up any slack and thus preclude any tendency for the chains 22A and 22B to jump off of their sprockets when the vehicle is operated.

The shroud 10 (FIG. 1) is optional, and the overall styling and appearance may be varied as a matter of design choice.

Figure 4:
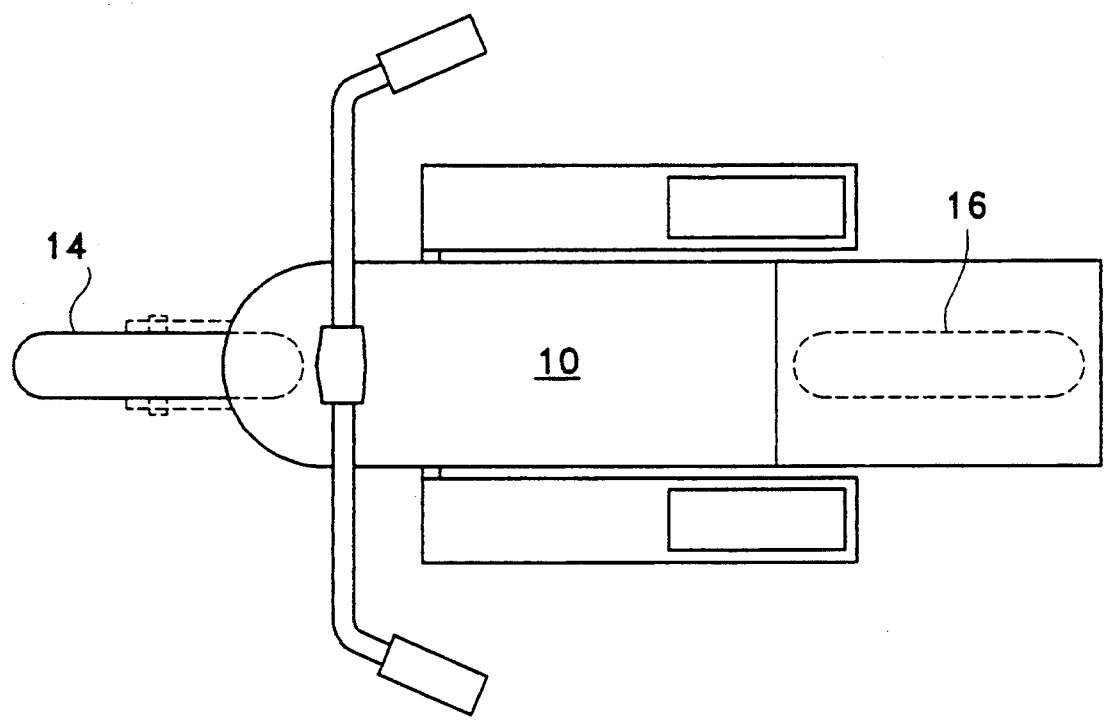
FIG. 4 is a plan view of a preferred two-wheeled embodiment of the present invention.

FIG. 4 is a plan view of the above-described embodiment of the present invention having a single front wheel 14 and a single rear wheel 16.

Figure 5:
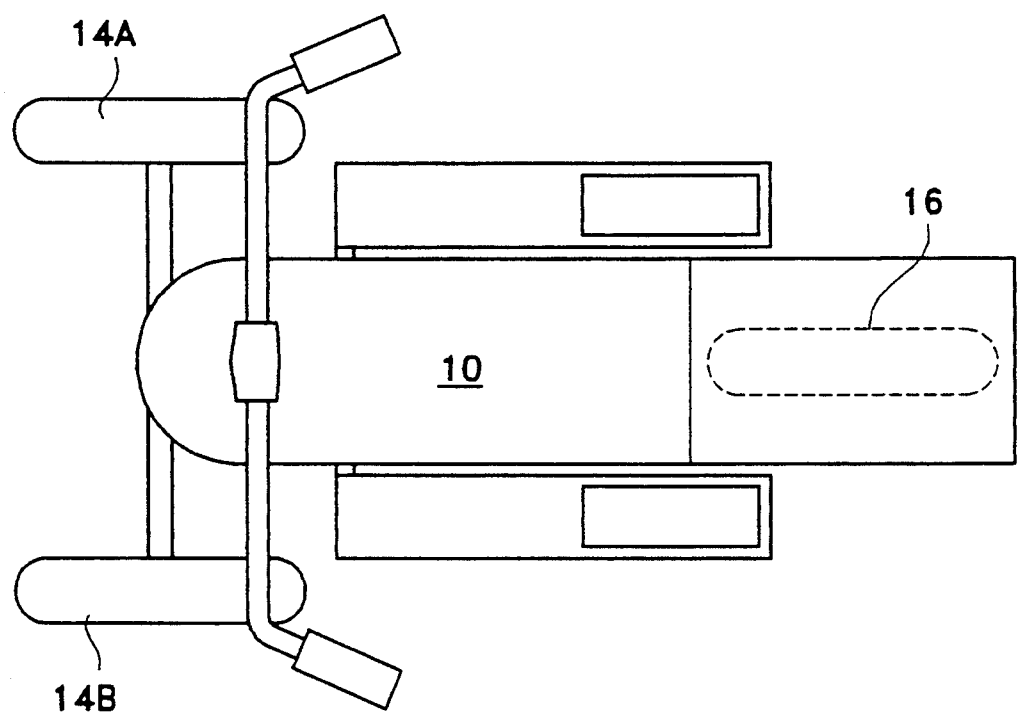
FIG. 5 is a plan view of a first three-wheeled embodiment of the present invention.

FIG. 5 is a plan view of a tricycle embodiment of the present invention having a pair of parallel wheels 14A and 14B in the front wheel assembly.

Figure 6:
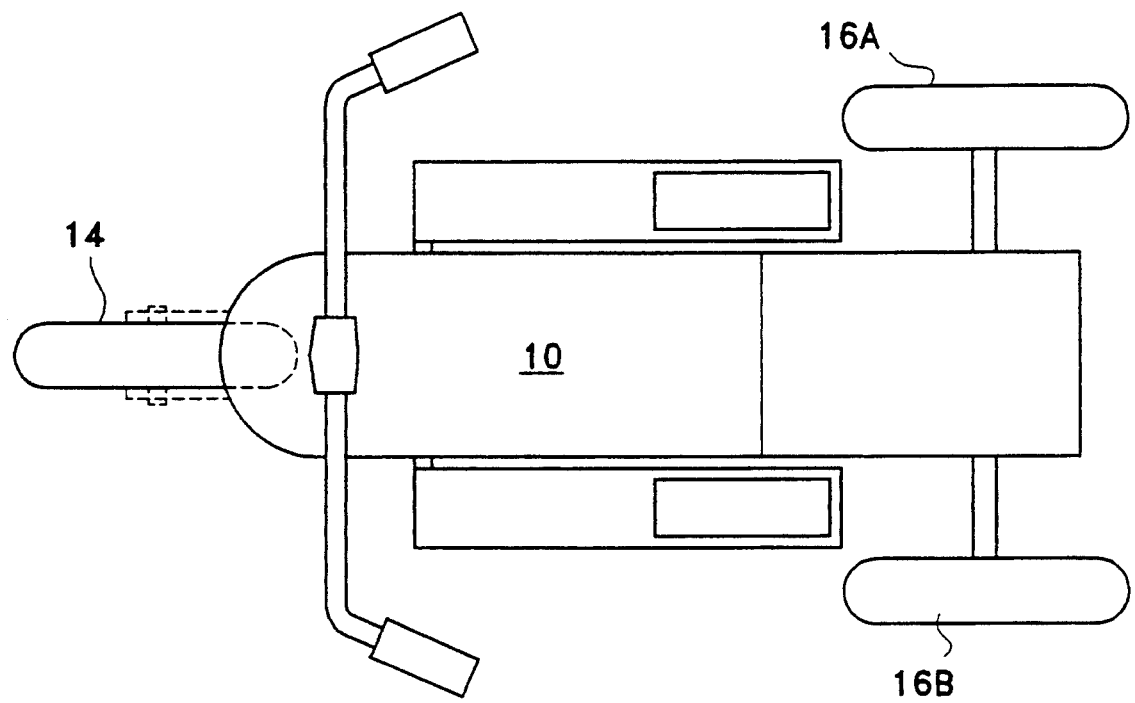
FIG. 6 is a plan view of a second three-wheeled embodiment of the present invention.

FIG. 6 is a plan view of a tricycle embodiment of the present invention having a pair of parallel wheels 16A and 16B in the rear wheel assembly.

Figure 7:
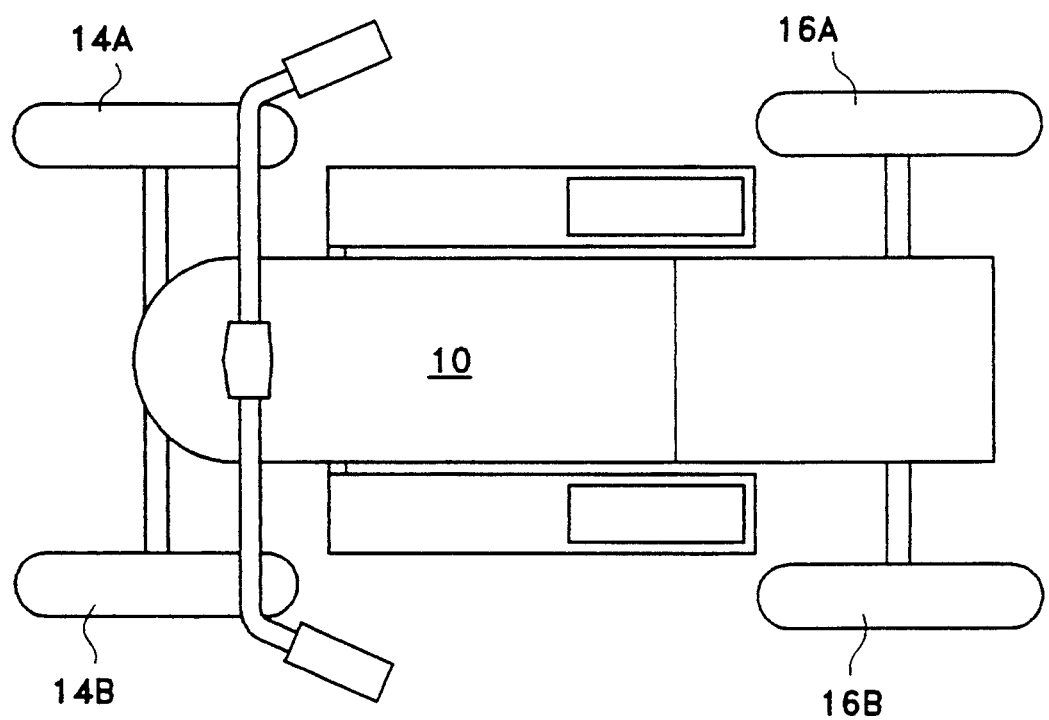
FIG. 7 is a plan view of a four-wheeled embodiment of the present invention.

FIG. 7 is a plan view of a four-wheeled embodiment of the present invention having a pair of parallel wheels 14A and 14B in the front wheel assembly and a pair of parallel wheels 16A and 16B in the rear wheel assembly.

The cycle of this invention could be converted to a stationary exercise machine by providing a rear support stand which elevates the rear wheel(s). Furthermore such a support stand could be provided with accessories such as controllable braking means, dynamometer means and/or other facilities for measurement and indication of speed, power, etc.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A vehicle to be propelled by predominantly vertical foot movement of a human rider, comprising:

an elongated chassis;

a front wheel steerably attached to a front end of said chassis;

a rear wheel mounted to a rear portion of said chassis;

a pair of elongated footboards, disposed longitudinally along opposite sides of said chassis, extending rearwardly beyond a leading edge of said rear wheel;

pivot means, disposed at a front end of each of said footboards, for attaching each footboard hingedly to a lower front region of said chassis in a manner allowing rotation of said footboards in a vertical plane;

a driving mechanism having cross-coupling means connected to said footboards for causing complementary opposed pivoting movement of said footboards such that pivotal displacement of either of said footboards by downward depression causes an equal upward pivotal displacement of the other footboard, said driving mechansim being adapted to transmit energy, generated by the rider alternatively pressing said footboards downward with body weight via legs and feet, to said rear wheel as driving torque to propel the vehicle, said driving mechanism having a major portion thereof located substantially forward of said rear wheel at a height not exceeding that of said rear wheel.

2. The human-propelled vehicle as defined in claim 1 wherein said driving mechanism comprises;

a tensile member, constituting the cross-coupling means, having a first and second end portions, each leading downwardly to one of said footboards and each attached thereto respectively;

a driveshaft mounted transversely in said chassis, in a lower forward region thereof;

a first and a second rotational unidirectional-driving means, attached respectively at a first and at a second and opposite end of said driveshaft, engaging respectively the first end portion and the second end portion of said tensile member, said unidirectional driving means being adapted to rotate said driveshaft in a designated forward driving direction in response to travel of either one of the first and second end portions of said tensile member in a rearward-downward direction;

a first and a second idler member, disposed on opposite sides of said chassis above said footboards and attached rotatably to said chassis, for guiding and redirecting said first and second end portions of said tensile member respectively;

first and second guide pulleys, disposed at opposite sides of said chassis forward and upward from said driveshaft, in guidance engagement with a mid portion of said tensile member attached between the first and second portions thereof;

a main sprocket concentrically secured to said driveshaft in a central region thereof;

a loop roller chain engaging said main sprocket; and a sprocket concentric with said rear wheel and engaged therewith by ratio means for rotating the rear wheel in a predetermined ratio relative to rotation of said sprocket;

whereby the rider is enabled to propel said vehicle by alternately applying weight on said footboards.

3. The human-propelled vehicle as defined in claim 2 wherein said tensile member comprises;
   a first length of roller chain, constituting the first end portion of said tensile member;
   a second length of roller chain, constituting the second end portion of said tensile member; and
   a length of flexible steel cable constituting the mid portion of said tensile member.

4. The human-propelled vehicle as defined in claim 3 wherein said first and second rotational unidirectional-driving means comprise a first drive sprocket coupled to the driveshaft via a first unidirectional self-engaging clutch mechanism, and a second drive sprocket coupled to the driveshaft via a second unidirectional self-engaging clutch mechanism, and wherein said first and second idler members comprise a first idler sprocket and a second idler sprocket, said drive sprockets and said idler sprockets being toothedly engaged with corresponding portions of the roller chain in said tensile member.

5. The human-propelled vehicle as defined in claim 3 further comprising a takeup cable system having a takeup cable having two opposite ends connected to opposite ends of said tensile member so as to complete a loop of predetermined length, the takeup cable being directed through a plurality of idler pulleys disposed and attached to said chassis in a manner to prevent excessive slack from developing in said tensile member during operation of said vehicle.

6. A vehicle to be propelled by predominantly vertical foot movement of a human rider, comprising:
   an elongated chassis;
   a front wheel assembly steerably attached to a front end of said chassis;
   a rear wheel assembly mounted to a rear portion of said chassis;
   a pair of elongated footboards, disposed longitudinally along opposite sides of said chassis, extending rearwardly beyond a leading edge of said rear wheel;
   pivot means, disposed at a front end of each of said footboards, for attaching each footboard hingedly to a lower front region of said chassis in a manner allowing rotation of said footboards in a vertical plane; and
   a driving mechanism including a tensile member having first and second opposite ends each attached to a corresponding one of said footboards, and having corresponding opposite end portions each leading upwardly from said footboards thence redirected forwardly by idler means, the tensile member thus cross-coupling said footboards such that downward pivotal displacement of either of said footboards from downward depression causes an equal upward pivotal displacement of the opposite footboard, said driving mechanism being adapted to convert energy, transmitted as reciprocating travel of said tensile member by the rider alternately pressing said footboards downward with body weight via legs and feet, as driving torque to said rear wheel assembly to propel the vehicle, and said driving mechanism having a major portion thereof located substantially forward of said rear wheel assembly at a height not exceeding that of said rear wheel assembly.

7. The human-propelled vehicle as defined in claim 6 wherein said front wheel assembly comprises a single wheel and said rear wheel assembly comprises a parallel pair of wheels.

8. The human-propelled vehicle as defined in claim 6 wherein said front wheel assembly comprises a parallel pair of wheels and said rear wheel assembly comprises a single wheel.

9. The human-propelled vehicle as defined in claim 6 wherein said front wheel assembly and said rear wheel assembly each comprise a parallel pair of wheels.

* * * * *